United States Patent
Moraru et al.

(10) Patent No.: US 8,926,235 B2
(45) Date of Patent: Jan. 6, 2015

(54) DRILLING HEAD WITH AXIAL VIBRATIONS

(75) Inventors: George Moraru, Aix en Provence (FR); Philippe Veron, Saint Cannat (FR); Patrice Rabate, Lahoussoye (FR)

(73) Assignees: Arts, Paris (FR); European Aeronautic Defence and Space Company Eads France, Paris (FR)

( * ) Notice: Subject to any disclaimer, the term of this patent is extended or adjusted under 35 U.S.C. 154(b) by 551 days.

(21) Appl. No.: 13/266,611

(22) PCT Filed: Apr. 28, 2010

(86) PCT No.: PCT/EP2010/055690
§ 371 (c)(1),
(2), (4) Date: Jan. 17, 2012

(87) PCT Pub. No.: WO2010/125090
PCT Pub. Date: Nov. 4, 2010

(65) Prior Publication Data
US 2012/0107062 A1 May 3, 2012

(30) Foreign Application Priority Data
Apr. 28, 2009 (FR) .................................... 09 02051

(51) Int. Cl.
*B23B 37/00* (2006.01)
*B23B 29/12* (2006.01)
*B23B 47/34* (2006.01)

(52) U.S. Cl.
CPC ............... *B23B 29/125* (2013.01); *B23B 37/00* (2013.01); *B23B 47/34* (2013.01); *B23B 2228/36* (2013.01); *B23B 2260/008* (2013.01); *B23B 2260/066* (2013.01); *B23B 2260/108* (2013.01); *Y10S 408/70* (2013.01); *Y10S 82/904* (2013.01)
USPC ........... 408/17; 408/700; 82/904; 310/323.19

(58) Field of Classification Search
CPC .................................. B23B 37/00; B24B 1/04
USPC ....... 408/17, 700; 82/904; 451/165; 173/217, 173/105, 114, 117, 122, 90, 104; 310/323.13, 323.19, 317
See application file for complete search history.

(56) References Cited

U.S. PATENT DOCUMENTS 2,848,672 A * 8/1958 Harris ............................ 318/118
2,947,886 A * 8/1960 McGunigle ................... 310/325

(Continued)

FOREIGN PATENT DOCUMENTS

DE  103 43 682 A1  4/2005
EP  0 994 758 B1  4/2003

(Continued)

OTHER PUBLICATIONS

International Search Report, dated Oct. 1, 2010, from corresponding PCT application.

*Primary Examiner* — Daniel Howell
*Assistant Examiner* — Ryan Rufo
(74) *Attorney, Agent, or Firm* — Young & Thompson

(57) ABSTRACT

A drilling head (1) with an axial oscillation generator, includes a mounting (2) for coupling the head to a motor for rotating the mounting about an axis, the mounting (2) having a longitudinal axis (5) coinciding with the axis of rotation of the motor, a tool holder (3), an elastically deformable element (6) for retaining the tool holder (3) in the mounting (2) and an element (7) for guiding the tool holder (3) in the mounting (2) along the longitudinal axis (5) of the mounting, wherein the mounting of the drilling head includes a controlled generator (8) of reciprocating movements in the direction of the aforementioned axis (5) positioned between the mounting (2) and the tool holder, the tool holder and the generator being connected by a longitudinal coupling member (9) suitable for damping the impacts withstood by the tool holder while enabling the transmission of the reciprocating movements.

13 Claims, 5 Drawing Sheets

(56) References Cited

U.S. PATENT DOCUMENTS

| | | | |
|---|---|---|---|
| 5,144,771 A * | 9/1992 | Miwa | 451/165 |
| 5,305,556 A * | 4/1994 | Kopp et al. | 451/165 |
| 5,440,190 A * | 8/1995 | Imabayashi et al. | 310/323.13 |
| 5,948,574 A * | 9/1999 | Okamoto | 430/5 |
| 6,234,728 B1 | 5/2001 | Brun-Picard et al. | |
| 7,824,247 B1 * | 11/2010 | Bar-Cohen et al. | 451/165 |
| 2006/0251480 A1 | 11/2006 | Mann et al. | |
| 2007/0107565 A1 | 5/2007 | Campbell et al. | |
| 2008/0041604 A1 | 2/2008 | Sauer | |
| 2011/0170964 A1 * | 7/2011 | Rabat et al. | 408/17 |

FOREIGN PATENT DOCUMENTS

| | | | |
|---|---|---|---|
| EP | 994 758 | 4/2003 | |
| EP | 2 070 616 A1 | 6/2009 | |
| FR | 2 765 505 A1 | 1/1999 | |
| JP | 03-228507 A * | 10/1991 | B24B 1/04 |
| JP | 2006/159299 A | 6/2006 | |

* cited by examiner

DRILLING HEAD WITH AXIAL VIBRATIONS

The present invention relates to a drilling head fitted with a generator of axial oscillations (vibrations).

BACKGROUND OF THE INVENTION

A drilling machine has the disadvantage of producing long chips which present various problems in the drilling operation because they are difficult to move quickly away from the work zone and may impair the quality of the surface of the hole produced.

One remedy to this disadvantage is to cause these chips to break up by varying their thickness and by repeatedly interrupting the cutting operation. This is achieved by applying to the cutting tool, which is generally a drill bit, an axial vibration which makes the feedrate (the rate of penetration into the material) cyclically variable and therefore makes the thickness of the chip variable, with amplitudes and frequencies that cause the chips to break up.

At the same time, there are drilling operations in which it is beneficial to vibrate the tool only at certain times (when drilling multilayer materials for example) or to change the amplitudes and/or the frequencies of the oscillations in real time (in order to react and to adapt the cutting process to suit the material being drilled for example). It is therefore necessary to have a device that can be controlled, with sufficiently rapid reaction and the ability to determine the passage from one material to another.

Several devices that use axial oscillations in drilling have already been proposed. For example, mention may be made of the device described in document EP 994 758. The latter describes a coupling between a tool holder and its driving mount which constitutes a suspending of the tool holder from the mount in such a way that it can produce self-sustaining axial oscillations such that the rate at which the tool penetrates the workpiece varies cyclically around a mean rate which is of course non-zero.

Another document, DE 103 43 682, discloses a milling or drilling tool in which the rotary tool is subjected to a reciprocating axial movement by means of a piezoelectric or magnetic actuator housed in the tool holder, connected wirelessly to a power supply. The system is controlled remotely. This tool is intended for machining composite materials at very high (ultrasonic) frequencies and very low amplitudes of axial vibration.

Another document, US2008/041604, discloses a tool with an oscillating head in which the rotary tool is subjected to very high frequency oscillations which frequencies have to be equal to the natural frequency of the tool, so that the oscillation generated causes the tool to resonate axially. The actuators in the solutions described in document US2008/041604 are fully incorporated into the axial moving part of the devices, being incapable of generating movements and static or low-frequency loads at amplitudes high enough to break up the chips. In addition, because they involve the use of resonance, the characteristics of the oscillations obtained are very much dependent on the load, that is to say on the penetration force encountered during the machining operation.

OBJECT OF THE INVENTION

The known devices do not have all the qualities required of a machine for universal use with regard to the breaking-up of the chip produced during drilling by superposing axial oscillations on the advancing feed movement of the tool, namely a device that is robust, is able to generate axial oscillations of sufficient amplitude to break up the chips, that can be fitted to existing machines, and that has the ability to be adapted to suit different drilling programs, notably to take account of the various different materials through which the drill passes in one and the same operation. For example, it is known that the oscillations generated by the devices described in EP 994 758 and in US2008/041604 are sensitive to the load, which means to say that they are dependent on the cutting diameters and conditions (tools, cutting parameters etc.). It is also known that piezoelectric actuators are fragile and are unable to withstand stresses other than compressive loadings.

BRIEF DESCRIPTION OF THE INVENTION

To this end, the subject of the present invention is a drilling head with a controlled generator of axial oscillations, comprising a mount for coupling the head to a motor that drives the rotation of the mount about an axis, the mount having a longitudinal axis that coincides with the axis of rotation of the motor, a tool holder, elastically deformable suspension means for suspending the tool holder from the mount which are capable of transmitting torsion moments and guide means to guide the tool holder in the mount along the longitudinal axis of this mount, comprising a controlled generator of reciprocating movements (oscillations) in the direction of the above-mentioned axis, interposed between the mount and the tool holder.

For preference the controlled generator (also known as the actuator) is tubular and of the piezoelectric actuator type, pressing against the tool holder mount via one of its ends, while the drilling head according to the invention comprises a sliding pivot, e.g. comprises a bearing in which is guided a shank of the tool holder, between the mount and the tool holder produced inside the tubular controlled generator, an axially elastic external sleeve of high torsional stiffness fixed by its ends to the mount and to the tool holder respectively, and an annular shim of determined axial stiffness and low flexural stiffness via which the tool holder presses axially against the end of the controlled generator.

The external sleeve and the annular shim serve to establish a preload on the controlled generator. The combined length of the controlled generator and of the annular shim in relation to the free length of the external sleeve and to its elastic property in the axial direction allows the preload on the controlled generator to be adjusted. The annular shim, which is axially stiff, allows the vibrations emanating from the controlled generator to be transmitted to the tool holder while its flexural flexibility safeguards the controlled generator against sudden variations in bending moments resulting from the drilling process and from any play there might be in the sliding pivot.

In an alternative form of embodiment of this example, the transmission of torque between the mount and the tool holder is performed by a guideway connection between the mount and the tool holder (a linear ball bearing on a profiled or splined shaft) so that the only remaining function of the external sleeve is to preload the controlled generator.

The structure of this external sleeve may be composite with wall portions that have high thermal conductivity or cutouts to encourage the dissipation of heat caused by the heating-up of the controlled generator.

In another embodiment, the drilling head comprises a sliding pivot between the mount and the tool holder inside the tubular controlled generator, an axially elastic external sleeve of high torsional stiffness fixed by its ends to the mount and to the tool holder respectively with, in parallel, at least one washer capable of transmitting radial load, which is fixed between the mount and the tool holder, and an annular shim of determined axial stiffness via which the tool holder presses axially against the end of the controlled generator.

As in the previous embodiment, the combined length of the controlled generator and of the annular shim in relation to the free length of the external sleeve and to its elastic property in the axial direction allows the preload on the controlled generator to be adjusted. The piezoelectric actuator is protected against torsion moments both by the external sleeve and by the aforementioned flexible element which together relieve the annular shim from the need to isolate the tool holder from the controlled generator torsionally; this measure makes it possible to react radial load that cannot be reacted by the sliding pivot connection when this connection has play, even if this play is small. It is possible to employ another washer for suspending the tool holder from the mount in parallel with the first one and therefore also with the external sleeve, this other washer being situated in the region of the pressing annular shim, which has reliefs passing through the washer via openings provided for that purpose. When there are two washers that are flexible in the axial direction co-existing, they form an axial guide of the guideway type suited to small axial movements and are able to react radial load, in which case the sliding pivot connection inside the tubular controlled generator, afforded by a ball-and-cage assembly for example, is no longer absolutely essential. The presence of such a connection (sliding pivot) does nonetheless make it easier for the tool holder and mount to be positioned accurately, complying with a set coaxiality tolerance, before the elastic guide elements are set in position during the assembly phase. If axial guidance is afforded only by elastic guide elements and the sliding pivot connection is abandoned, the tool holder will have to be positioned accurately with respect to the mount during assembly.

A contactless power transmission using electromagnetic transmitter-receiver systems (rotary transformer) is preferred. However, a contacting connection could be used via a slip-ring assembly.

In one particular alternative form of the embodiment of the invention, the controlled generator may incorporate a sensor capable of indicating the force that the drill bit is applying axially to the workpiece during machining. This sensor may take a direct measurement of this load, for example using the direct piezoelectric effect, with the aid of a few layers of piezoelectric material, or may take an indirect measurement, for example of the deformation of the controlled generator (deformation gauge for example), in which case the signal will need to be processed in order to determine the drilling load. It is thus possible to collect data regarding the variation of this force and use it to control the actuator or even to control the cutting parameters using the machine used (instantaneous cutting speed, feed rate). Specifically, this indication of the instantaneous value of the axial force involved in the drilling operation is a variable that is interpreted by a signal processing unit in order to modify the drilling parameters using a model contained in software, running on a data processing unit (computer for example). Typically, the variation in this axial load on the piezoelectric sensor-actuator can be interpreted as the passage from one material to another in a given assembly being drilled. Via this detection, the processing unit can modify the drilling parameters at the detected moment of passage from one material to another and can thus optimize the operation by reference to stored drilling programs.

Other features and advantages of the invention will become apparent from the description given hereinafter of one embodiment of the invention.

BRIEF DESCRIPTION OF THE DRAWINGS

Reference will be made to the attached drawings in which.

DETAILED DESCRIPTION OF THE INVENTION

Figure 1:
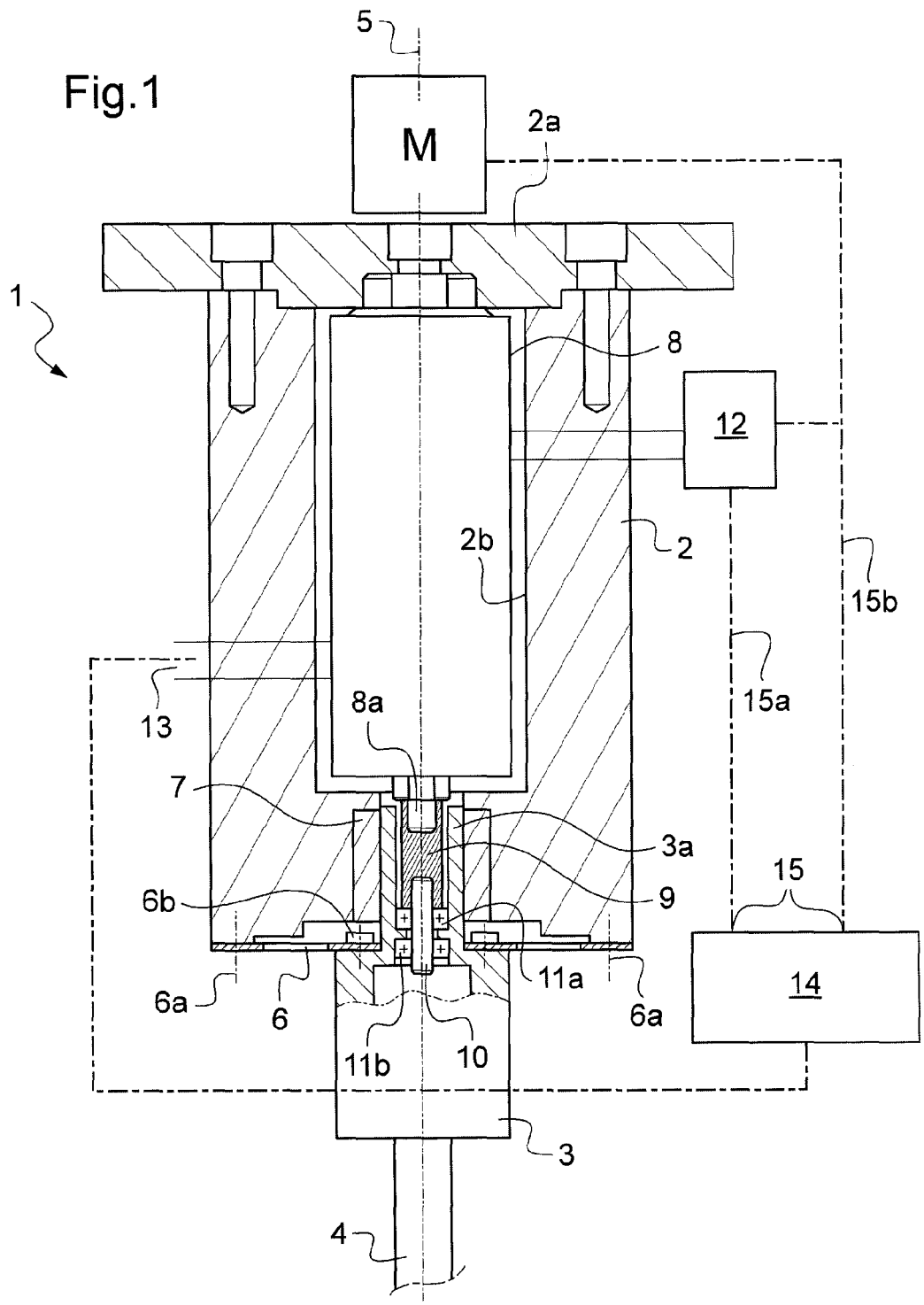
FIG. 1 is a schematic cross section of a device according to the invention.

In FIG. 1, the drilling head depicted as 1 comprises a mount 2 and a tool holder 3 to keep a drill bit 4 coaxial with a longitudinal axis 5 of rotation of the mount 2.

Via a second end 2a, the mount is coupled to a drive motor M depicted schematically and an axis of rotation of which is coaxial with the longitudinal axis 5 which is also the longitudinal axis of the mount 2.

The tool holder 3 is fixed to the mount 2 by a washer 6 which has the property of transmitting a torque between the mount and the tool holder and which is elastically deformable in the direction of the longitudinal axis 5. One example of such a washer is described in document EP 994 758. This washer 6 is fixed by peripheral screws 6a to the mount 2 while the tool holder 3 is fixed to the washer 6 by central screws 6b. The tool holder 3 has a shank 3a which is guided with axial sliding in a bearing 7 of the mount.

The mount 2 is hollow and its central recess 2b contains a piezoelectric actuator 8 of which the oscillations, which are generated by a variable voltage applied to it, are directed along the longitudinal axis 5. The upper end of this controlled generator, in which the piezoelectric elements are contained in a housing that preloads them, is fixed to the mount at its upper part 2a. Its lower part itself is fixed to the part 3a of the tool holder. This fixing is performed using a longitudinal coupling member 9 having properties of reacting bending stresses (which have to exist because of the play in and imperfections of the bearing 7) while at the same time allowing the reciprocating movements to be transmitted. This member 9 connects the vibrating end 8a of the controlled generator to a pivot 10 which is wedged in terms of translation in the part 3a of the tool holder by means of two thrust ball bearings 11a and 11b that allow the controlled generator 8 to be torsionally decoupled from the tool holder 3 if the washer 6 breaks.

The power supply controlling the piezoelectric actuator has been depicted symbolically as 12. Depending on circumstance, this may be of the contactless type (rotary transformer plus integrated electronics) or of the contacting type (of the slip-ring assembly type based on sliding contacts).

It is advantageous to use part of the active element of the controlled generator as a sensor of the axial loads to which it is subjected. The output from this sensor is denoted 13 in the figure. It will be of the contactless or of the contacting type depending on circumstance consistent with the supply of power to the controlled generator 8. The signals emitted are directed to a processing unit 14 which at output 15 emits an actuator control signal that will be dependent on the input signal. Indeed it is known that the input signal is indicative of the axial load applied to the actuator; it is therefore representative of the resistance to penetration of the tool into the workpiece during machining and therefore of the nature of the material being worked. A variation in this signal corresponds, for example, in the case of a multilayer workpiece, to the crossing of an interface which may lead to a change in how the drilling operation progresses, not only in terms of the control of the actuator (via a transmission path 15a toward the controlled generator or the source of its power supply) but also in terms of the motor M that drives the rotation of the tool (via another transmission path 15b originating from the output 15 from the unit 14) and in terms of the rate at which the drill bit penetrates the workpiece, this being, for example, dependent on setpoint values stored in memory within the unit 14. Just as was the case with control of the actuator, the output from the sensor will be processed preferably contactlessly, using any appropriate means (transponder or the like) for transferring the signals from a rotating sensor to a fixed processing unit and for powering the sensor where necessary. Incidentally, providing all or part of the signal processing unit within the tool holder would not constitute departure from the scope of the invention.

Figure 2:
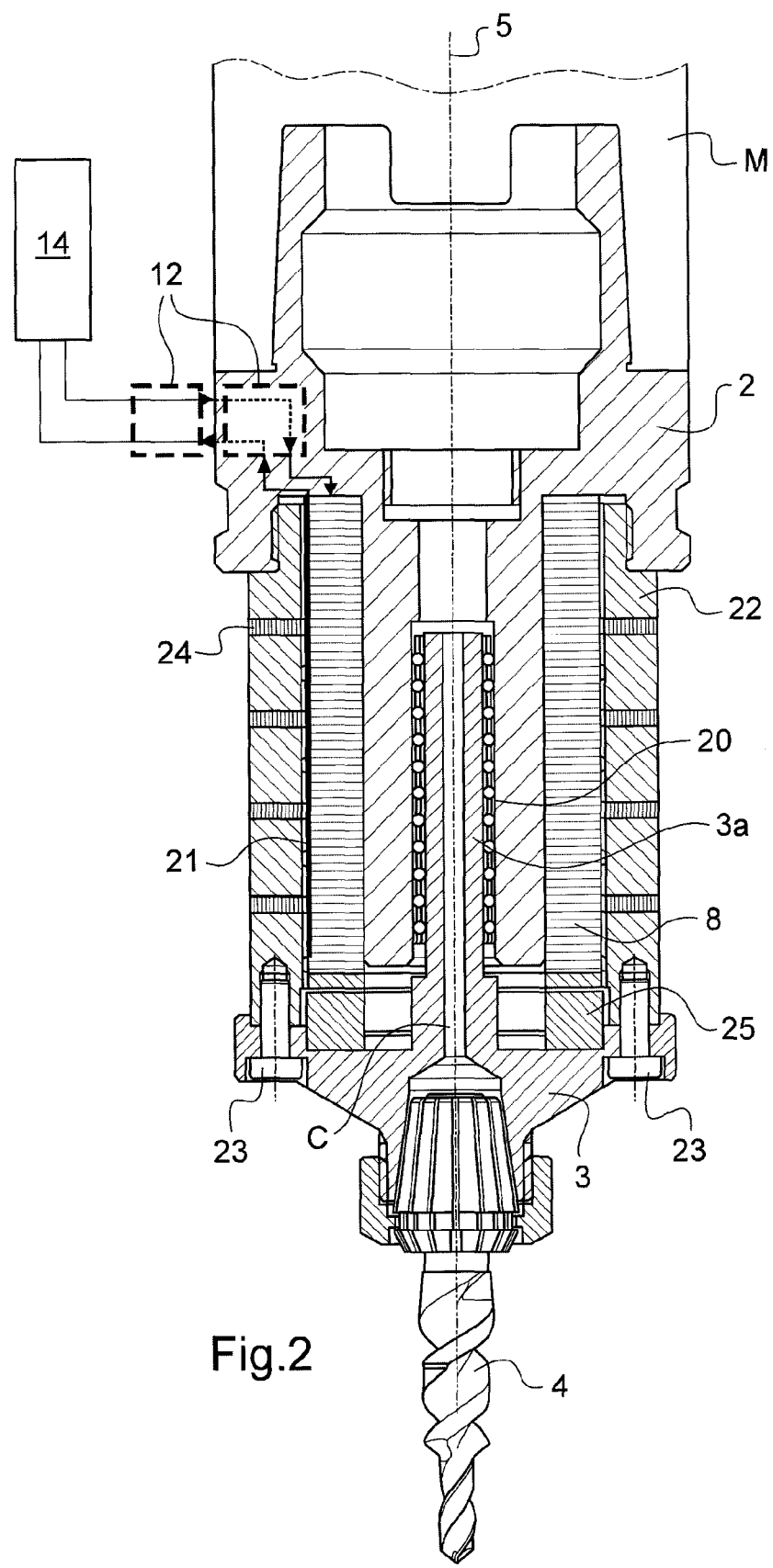
FIG. 2 is an axial cross section through a first embodiment of the device according to the invention.
Figure 3:
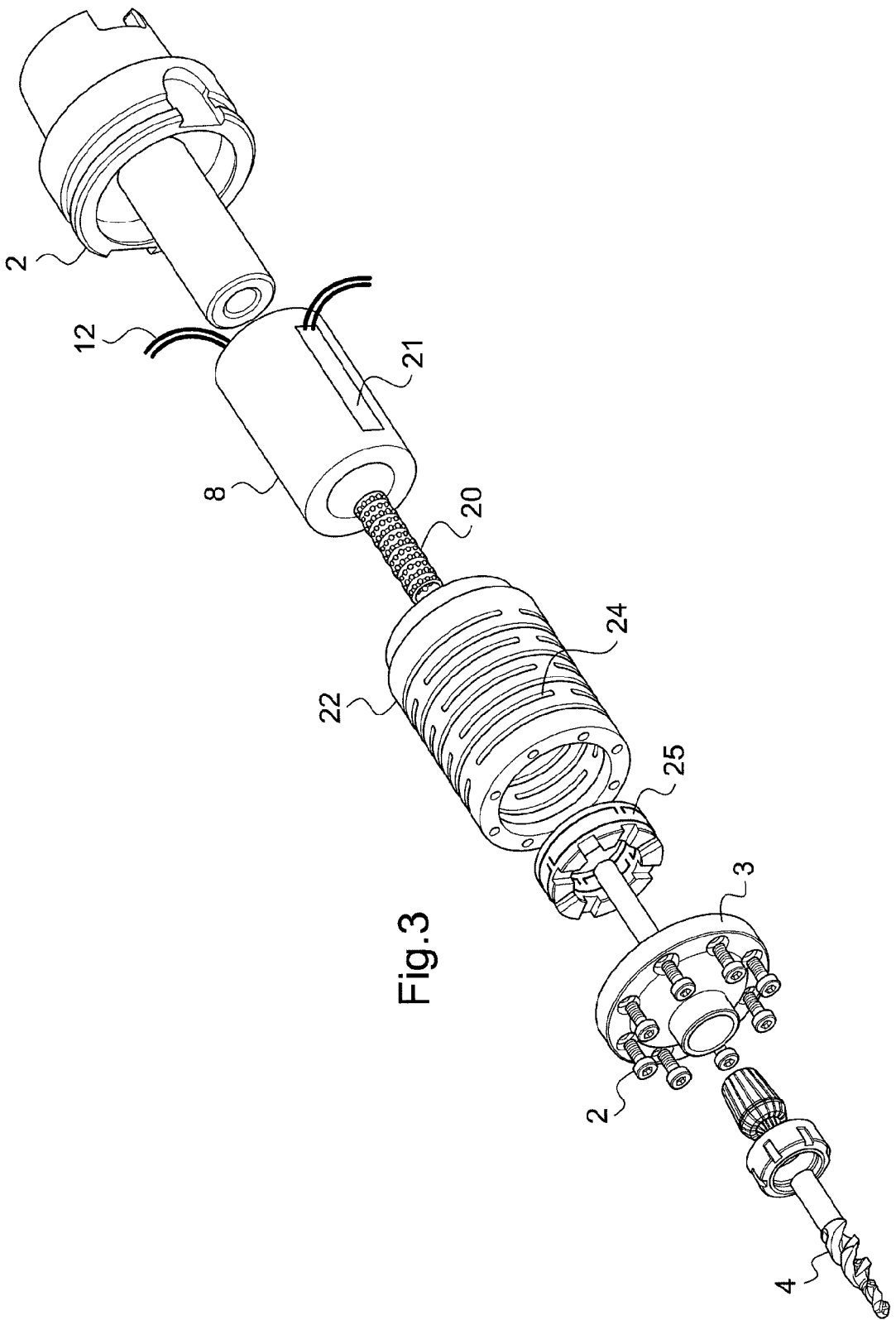
FIG. 3 is an exploded view of the components of FIG. 2.

FIGS. 2 and 3 depict again most of the elements already described, using the same references. The mount 2 is coupled to the machine element M which may be a rotary shaft protruding from a motor or a fixed component if, for example, the workpiece is rotating about the axis 5. The mount 2 accepts a shank 3a of the tool holder 3 via a ball-and-cage assembly or linear ball bearing 20 which provides axial guidance (sliding pivot) of the tool holder 3 in the mount 2. This guidance is afforded inside the controlled generator 8 which in this instance is of tubular shape, without preload (raw piezoelectric material). The axial load measurement means (load sensor) here is represented in the form of a strain gauge 21 extending along an external power generator of the controlled generator 8.

The essential difference between this embodiment and the diagram of FIG. 1 lies in the means of coupling the tool holder 3 to the mount 2 which are able both to transmit the torque stemming from the drilling operation and the axial oscillations while at the same time safeguarding the controlled generator 8 against the torsional or bending forces that would impair its operation.

These means of coupling here comprise an external sleeve 22 screwed into the mount 2 by its second ends while its first end is coupled by screws 23 to the tool holder 3. This external sleeve has the property of being torsionally very stiff but relatively flexible in the axial direction, having a set axial stiffness. For this purpose, it is cut circumferentially with a multitude of slots 24 which make it axially elastic while at the same time preserving its torsional stiffness. The number and the dimensions of the slots will be determined in such a way as to afford an axial elastic characteristic that will be calculated to achieve the preload to be applied to the controlled generator 8. This characteristic will, however, be compatible with the energy of vibration in order not to dissipate this energy too much, for example by having too great an axial stiffness with respect to the loads. The slots may be filled with a material of high thermal conductivity in order to dissipate the heat given off by the actuator as it operates. The external sleeve 22 is used firstly to suspend the tool holder from the mount and secondly to transmit the torsion moments resulting from the cutting forces from the one to the other, while at the same time achieving the necessary preload that the actuator needs. Geometric shapes other than that described hereinabove can be used for the external sleeve 22, provided that all of these functions are performed. Thus, this external sleeve may comprise an alternating succession of internal and external grooves which give it the appearance of a bellows of determined axial stiffness.

The coupling means also comprise an annular shim 25 which is interposed and trapped between one end of the controlled generator 8 and the tool holder 3. The material and geometry of this annular shim 25 will be chosen so that the transmission of the axial oscillations generated by the controlled generator 8 is maintained while at the same time minimizing the bending stresses resulting from the cutting force which could pass via the shank of the tool holder and the bearing of the mount, forming the sliding pivot connection, that necessarily has to have a functional clearance, all be it minimal. As far as the geometry of this annular shim 25 is concerned, it will be noted that it is provided with cutouts in planes that are parallel and perpendicular to the axis 5 which define two parts of this annular shim which are joined together in the manner of a Cardan joint allowing micromovements, therefore movements of small amplitude, with flexural flexibility that protects the piezoelectric actuator.

It will be noted in this solution that the tool holder 3 has, passing through it, a channel C which is made along its axis, thus providing a passage for any coolants and lubricants used to cool and/or lubricate the cutting zone. These coolants may also serve to improve the dissipation of heat from the actuator. Various sealing means and orifices made in the surrounding components could also be produced in order to bring this coolant into contact with the actuator, to bring about forced cooling.

Figure 4:
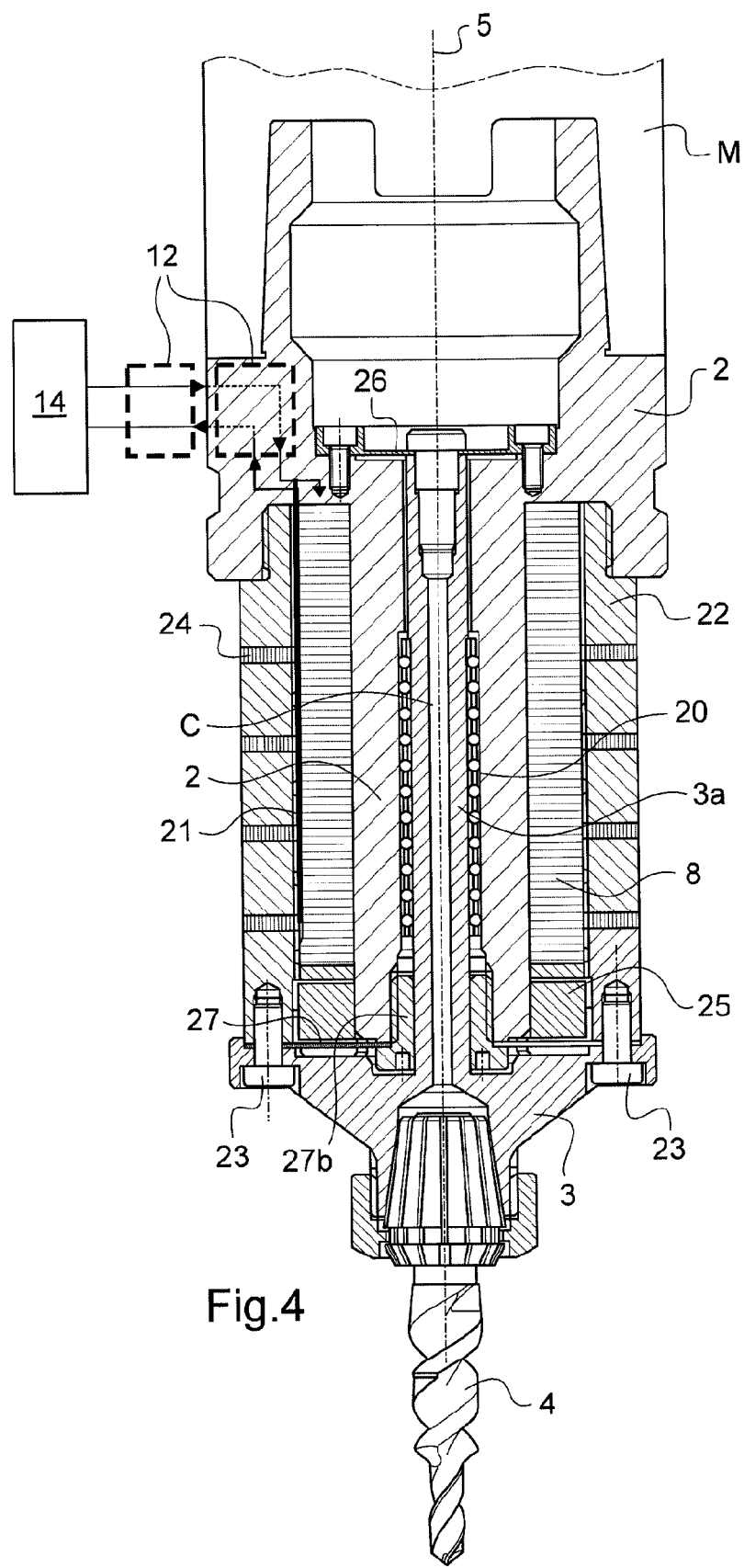
FIG. 4 is an axial cross section through a second embodiment of the device according to the invention.
Figure 5:
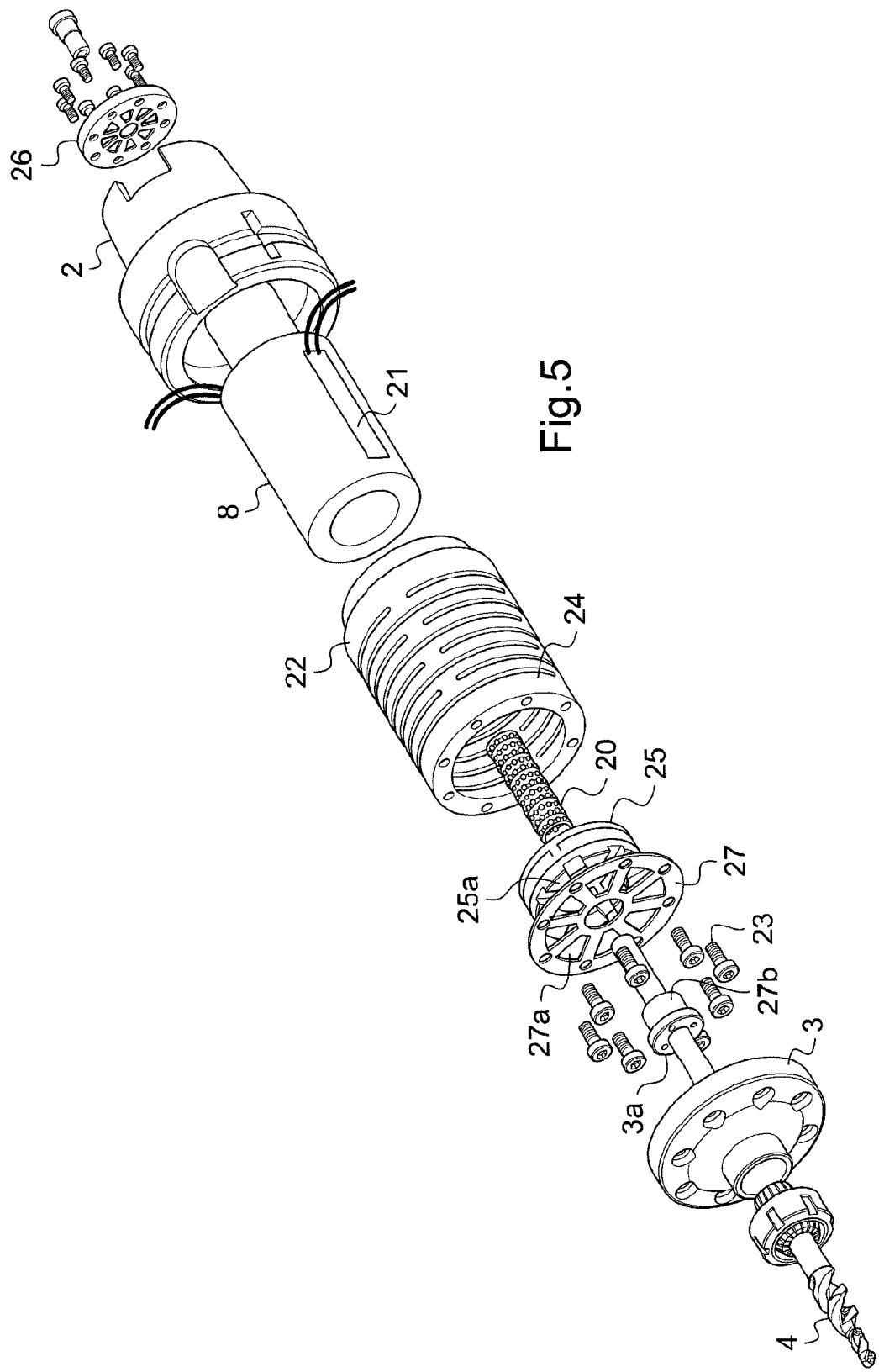
FIG. 5 is an exploded view of the device depicted in FIG. 4.

The embodiment depicted in FIGS. 4 and 5 is very similar to the one just described. The difference is from the presence of a second washer in the means of coupling between the mount and the tool holder. This second washer 26 is similar to the washer 6 in FIG. 1 in as much as, together with the external sleeve 22, it serves to suspend the tool holder 3 from the mount 2 and to add radial stiffness to the connection, at the opposite end of the tool holder from the tool, thus contributing to avoiding the lateral micromovements that could be permitted by the play in the sliding pivot connection. The transmission of torque continues to be afforded by the external sleeve 22, even if the second washer 26 when present contributes toward this.

It will be noted that there is a first washer 27, similar to the second washer 26, which has recesses 27a via which reliefs 25a belonging to the annular ring 25 pass through the second washer 26 to press against the tool holder 3. The hollows separating the reliefs in the annular shim 25 are of large enough dimensions to exceed the amplitude of the vibrations of the controlled generator 8 which are transmitted to the tool holder 3 by the annular shim 25, so as to prevent contact between the annular shim 25 and the first washer 27 at all times. The first washer 27 is fixed rigidly by the outer screws 23 to the external sleeve 22 and to the tool holder 3 and in an appropriate way (special screw 27b) to the spindle of the mount 2. The role of the first washer 27 is likewise to add radial stiffness at the tool end of the tool holder so as, together with the first washer 26, to create a guideway connection with flexible guidance suited to small-amplitude movements.

The axial stiffness of the external sleeve 22 is dependent on the preload that is to be imposed on the controlled generator 8. This load in fact corresponds to the difference in position along the longitudinal axis 5 between that face of the tool holder that faces toward the annular shim 25 and toward the external sleeve 22 and the free end of this external sleeve, before its attachment using the screws 23. This difference in position of the aforementioned two faces prior to assembly forms a mounting clearance which will need to be determined by the design and accurate production of the components. The fastening using the screws 23 will cause elastic elongation of the external sleeve 22 and, as a result, will cause compression (by an amount determined by the magnitude of the mounting clearance and by the axial stiffness of the external sleeve 22) of the controlled generator 8/annular shim 25 combination.

The invention makes it possible in a simple way to solve the problem of breaking up the chips of a drilling tool and to slave this break up and, more generally, the parameters of the operation, to a detection of the nature of the material being processed, and makes it possible to do so, particularly in the case of a piezoelectric actuator, using the same active member.

The invention claimed is:

1. A drilling head including a generator of axial oscillations, comprising:
   a motor with an axis of rotation;
   a mount for coupling said drilling head to the motor, the motor driving rotation of the mount about an axis, the mount having a longitudinal axis that coincides with the axis of rotation of the motor;
   a tool holder;
   suspension means interposed between the mount and the tool holder and suspending said tool holder from the mount,
   said suspension means comprising a controlled generator of reciprocating movements in the direction of the longitudinal axis, wherein said controlled generator of reciprocating axial movements is tubular and of the piezoelectric type without preload, pressing against the tool holder via a first end;
   said mount comprising a bearing inside the controlled generator to guide a shank of the tool holder along the longitudinal axis;
   said suspension means further comprising
   i) an external sleeve fixed by a first end to the tool holder and by a second end to the mount, said external sleeve being axially elastic to allow axial oscillation of the tool holder induced by the controlled generator, said external sleeve being of a torsional stiffness high enough to transmit the torsion moment resulting from cutting forces; and
   ii) an annular shim interposed between the controlled generator of reciprocating movements and the tool holder, said annular shim being of an axial stiffness to transmit axial oscillations, said annular shim being of a flexural stiffness low enough to reduce bending stresses transmitted to said controlled generator of reciprocating movements.

2. The drilling head as claimed in claim 1, wherein the external sleeve and the annular shim constitute means for applying an axial preload to the controlled generator of reciprocating movements.

3. The drilling head as claimed in claim 1, further comprising a guideway between the mount and the tool holder, inside the generator of reciprocating movements, allowing the transmission of torsion moments between the tool holder and the mount.

4. The drilling head as claimed in claim 1, further comprising at least one washer fixed between the mount and the tool holder, the at least one washer elastically deformable in the direction of the longitudinal axis and transmitting radial load.

5. The drilling head as claimed in claim 1, further comprising two washers fixed between the mount and the tool holder, the two washers elastically deformable in the direction of the longitudinal axis and transmitting radial load mounted in parallel.

6. The drilling head as claimed in claim 1, wherein the controlled generator of reciprocating movements carries a sensor that senses a force applied axially by the drill bit to the workpiece during machining.

7. A drilling head, comprising:
   a drive motor with an axis of rotation;
   a mount with a longitudinal axis and opposite first and second ends, the second end of the mount being coupled to the drive motor so that the longitudinal axis of the mount coincides with the axis of rotation of the motor, wherein the mount is hollow and includes a central recess;
   a tool holder that holds a drill bit coaxial with the longitudinal axis of rotation of the mount;
   a bearing located above the upper surface of the annular element and around the longitudinal axis of the mount,
   wherein the tool holder further comprises a shank extending up from the upper face of the tool holder and interior to the bearing such that the shank is guided with axial slide in the bearing;
   a controlled generator of reciprocating movements contained with the recess, the controlled generator comprising a piezoelectric actuator which generates oscillations directed along the longitudinal axis of the mount; and
   suspension elements interposed between the mount and the tool holder, the suspension elements suspending said tool holder from the mount and comprising
   i) a longitudinal coupling member that connects a lower vibrating end of the controlled generator to the tool holder, wherein longitudinal coupling member is sufficiently axially elastic to allow axial oscillation of the tool holder induced by the controlled generator, and wherein said longitudinal coupling member has a torsional stiffness high enough to transmit torsion moment resulting from cutting forces; and
   ii) an annular element interposed between the controlled generator and the tool holder, said annular element being of an axial stiffness to transmit axial oscillations, said annular element having a flexural stiffness low enough to reduce bending stresses transmitted to said controlled generator.

8. The drilling head as claimed in claim 7,
   wherein the longitudinal coupling member is an external sleeve fixed by a first end to the tool holder and by a second end to the mount, wherein said external sleeve is sufficiently axially elastic to allow the axial oscillation of the tool holder induced by the controlled generator, and wherein said external sleeve has the torsional stiffness high enough to transmit torsion moment resulting from cutting forces, and
   the annular element is an annular shim interposed between the controlled generator and the tool holder, said annular shim being having the axial stiffness to transmit the axial oscillations, and having the flexural stiffness low enough to reduce bending stresses transmitted to said controlled generator.

9. The drilling head as claimed in claim 8, wherein the external sleeve and the annular shim apply an axial preload to the controlled generator.

10. The drilling head as claimed in claim 7, further comprising a washer fixed between the mount and the tool holder, the washer being elastically deformable in the direction of the longitudinal axis and transmitting radial load.

11. The drilling head as claimed in claim 7, further comprising two washers fixed between the mount and the tool holder, the two washers elastically deformable in the direction of the longitudinal axis and transmitting radial load mounted in parallel.

12. The drilling head as claimed in claim 7, further comprising a sensor carried by the controlled generator, the sensor positioned to sense a force applied axially by the drill bit to a workpiece during machining.

13. The drilling head as claimed in claim 7, wherein the annular element is a washer that fixes the first end of the mount to the tool holder, the washer having an upper face and a lower face, wherein i) a periphery of the upper face of the washer is mounted to a lower face of the first end of the mount, and ii) a central part of the lower face of the washer is mounted to an upper face of the tool holder, and wherein the washer transmits a torque between the mount and the tool holder and is elastically deformable in a direction of the longitudinal axis of the mount, the bearing being located above the upper surface of the washer and around the longitudinal axis of the mount.

\* \* \* \* \*